United States Patent
Dai Pham (10) Patent No.: US 11,996,916 B2
(45) Date of Patent: May 28, 2024

(54) SYSTEMS FOR AND METHODS OF GROUND DIGITAL PRECODING FOR HYBRID TERRESTRIAL-SATELLITE MOBILE NETWORKS

(71) Applicant: Govt of US as Rep by the Secy of the Air Force, Wright Patterson AFB, OH (US)

(72) Inventor: Khanh Dai Pham, Albuquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 145 days.

(21) Appl. No.: 17/653,346

(22) Filed: Mar. 3, 2022

(65) Prior Publication Data
US 2022/0286166 A1 Sep. 8, 2022

Related U.S. Application Data (60) Provisional application No. 63/158,188, filed on Mar. 8, 2021, provisional application No. 63/158,213, filed on Mar. 8, 2021.

(51) Int. Cl.
*H04B 7/0456* (2017.01)
*H04B 7/08* (2006.01)
(Continued)

(52) U.S. Cl.
CPC ......... *H04B 7/0456* (2013.01); *H04B 7/0857* (2013.01); *H04L 47/129* (2022.05);
(Continued)

(58) Field of Classification Search
CPC ............... H04B 7/0456; H04B 7/0857; H04W 28/0268; H04W 28/0289
See application file for complete search history.

(56) References Cited

U.S. PATENT DOCUMENTS

| | | |
|---|---|---|
| 7,949,318 B2 | 4/2011 | Prasad |
| 8,140,070 B2 | 3/2012 | Ashikhmin |
| (Continued) | | |

OTHER PUBLICATIONS

X. Tian, G. Chen, K. D. Pham, and E. Blasch, "Joint Transmission Power Control in Transponded SATCOM Systems," IEEE Military Communications Conference, DOI: 10.1109/MILCOM.2016.7795313, Baltimore, MD, 2016.
(Continued)

*Primary Examiner* — Janice N Tieu
(74) *Attorney, Agent, or Firm* — AFMCLO/JAZ; Larry L. Huston (57) ABSTRACT

A method of precoding the power of a channel of a ground terminal in communication with a satellite. The ground terminal is subject to limitations in terrestrial mobile network rates and other congestion conditions. An actual signal-to-interference-plus-noise ratio is calculated and adjusted according to a desired signal-to-interference-plus-noise ratio for a predetermined time epoch. The actual signal-to-interference-plus-noise ratio is adjusted while considering the competing requirements of both: the energy of the difference between the successive actual/desired signal-to-interference-plus-noise ratio levels and the energy of the control sequences. The actual signal-to-interference-plus-noise ratio is autonomously converged with the desired with the signal-to-interference-plus-noise ratio, subject to the limitations in terrestrial mobile network rates and other congestion conditions, by dynamically minimizing covariance error and predicting gain for the epoch.

19 Claims, 6 Drawing Sheets

(51) Int. Cl.
  *H04L 47/129* (2022.01)
  *H04L 47/70* (2022.01)
  *H04L 47/76* (2022.01)
  *H04W 28/02* (2009.01)

(52) U.S. Cl.
  CPC ............ *H04L 47/76* (2013.01); *H04L 47/827* (2013.01); *H04W 28/0268* (2013.01); *H04W 28/0289* (2013.01)

(56) References Cited

U.S. PATENT DOCUMENTS

| | | | |
|---|---|---|---|
| 9,743,362 | B1 | 8/2017 | Tian |
| 9,991,587 | B1 | 6/2018 | Freedman |
| 2008/0165875 | A1 | 7/2008 | Mundarath |
| 2008/0232238 | A1* | 9/2008 | Agee .................... H04L 27/2627 370/208 |
| 2010/0091678 | A1 | 4/2010 | Chen |
| 2010/0303002 | A1 | 12/2010 | Zorba Barah |
| 2013/0329559 | A1* | 12/2013 | Cabrera ............ H04W 28/0284 370/235 |
| 2014/0092734 | A1* | 4/2014 | Ljung ..................... H04L 47/10 370/230 |
| 2017/0288769 | A1 | 10/2017 | Miller |
| 2018/0152230 | A1 | 5/2018 | Khojastepour |
| 2018/0152231 | A1 | 5/2018 | Jeong |
| 2022/0110018 | A1* | 4/2022 | Jha .................... H04W 28/0289 |

OTHER PUBLICATIONS

Pham KD. "Power allocation for shared transponders: A statistical optimal control paradigm." In2018 IEEE Aerospace Conference Mar. 3, 2018 (pp. 1-10). IEEE.

K. D. Pham, "Assured Satellite Communications: A Minimal-Cost-Variance System Controller Paradigm," American Control Conference, pp. 6555-6561, DOI: 10.1109/ACC.2016.7526702, Boston, MA, 2016.

K. D. Pham, "Minimal-Variance-Cost Power Control for Differentiated Services Satellite Communications," IEEE Aerospace Conference, pp. 1-8, DOI:10.1109/AERO.2016.7500831, Big Sky, MT, 2016.

K. D. Pham, "Minimal Variance Control of Clock Signals," IEEE Aerospace Conference, pp. 1-8, DOI:10.1109/AERO.2016.7500498, Big Sky, MT, 2016.

L. Cosenza, M. K. Sain, R. W. Diersing, and C.-H. Won, "Cumulant control systems: the cost-variance, discrete-time case," Advances in Statistical Control, Algebraic System Theory, and Dynamic System Characteristics, C.- H. Won et al. (eds), Birkhauser Boston, DOI: 10.1007/978-0-8176-4795-7, 2008.

G. Giorgi and C. Narduzzi, "Performance Analysis of Kalman-Filter-Based Clock Synchronization in IEEE 1588 Networks," in IEEE Transactions on Instrumentation and Measurement, vol. 60, No. 8, pp. 2902-2909, Aug. 2011, doi: 10.1109/TIM.2011.2113120.

K. D. Pham, "Control Engineering for Hybrid Ground and Space Precoding in Multi-Gateway Multi-Beam Satellite," 2021 IEEE Aerospace Conference (50100), 2021, pp. 1-9, doi: 10.1109/AERO50100.2021.9438378.

K. D. Pham, "Risk-Sensitive Rate Correcting for Dynamic Heterogeneous Networks: Autonomy and Resilience," 2020 IEEE Aerospace Conference, 2020, pp. 1-10, doi: 10.1109/AERO47225.2020.9172717.

K. D. Pham, "A Control-Theoretic Approach to Precoding for Multi-Cast Multi-Beam over Satellite," 2020 IEEE Aerospace Conference, 2020, pp. 1-11, doi: 10.1109/AERO47225.2020.9172594.

\* cited by examiner

SYSTEMS FOR AND METHODS OF GROUND DIGITAL PRECODING FOR HYBRID TERRESTRIAL-SATELLITE MOBILE NETWORKS

PRIORITY CLAIM

This application claims priority to and the benefit of U.S. Provisional Application No. 63/158,188, filed Mar. 8, 2021, the disclosure of which is incorporated herein by reference and claims priority to and the benefit U.S. Provisional Application No. 63/158,213, filed Mar. 8, 2021, the disclosure of which is incorporated herein by reference.

STATEMENT OF GOVERNMENT INTEREST

The invention described herein may be manufactured and used by or for the Government of the United States for any government purpose without the payment of any royalty.

FIELD OF THE INVENTION

The present invention relates to multibeam satellite communications and more particularly a method of controlling feeder link transmission from a ground gateway to multibeam satellites.

BACKGROUND OF THE INVENTION

Satellite communications (SATCOM) have become ubiquitous for communications. Most satellites use a bent pipe design, meaning that an uplink signal (earth to satellite) is received, amplified, translated to a downlink (satellite to earth) frequency, amplified again, and directed toward the earth using a high-gain antenna. A bent pipe satellite does not demodulate and decode the signal. Instead a gateway station on the ground is used to control the satellite and route traffic to and from the satellite and to the Internet. Bent pipe satellites are referred to as transparent repeaters or non-regenerative repeaters because they capture an uplink signal and redirect the signal back to earth without demodulating. A typical communication satellite has about 24 to about 100 transponders and is capable of processing millions of bits of information. The only processing by a bent pipe satellite is to retransmit the signal.

The gateway station also provides a feeder link to route traffic from a landline network (e.g., the Internet) to users. Separate frequency pairs are normally used for the feeder links. Geostationary satellite systems operating in the Ku and Ka bands (12/14 GHz, 17/24 GHz) typically employ geographical spot beams to reuse frequencies across North America.

During operation, a beam is a satellite broadcast down to plural user terminals in a specified coverage area. Particularly SATCOM with broadband and multicast services are often preferred for delivering broadband data to diverse users. Multicast services deliver data streams to specific beams, while broadband services deliver data streams to a set of user terminals within each beam.

The beam arrangement provides relatively wide geographical coverage while using minimal ground infrastructure through beamforming. Beamforming replaces omnidirectional transmission by efficiently forming the beam signal towards the direction of the intended user.

While terrestrial mobile base stations often serve mobile customers in urban areas, satellite networks often serve rural areas. Ground based digital precoding is used in an effort to conserve onboard satellite resources while leveraging the flexibility offered by on-ground digital signal processing. Ground based digital precoding is based upon the exchange of radiating element signals between a satellite payload and its gateway. The ground gateway performs full frequency reuse patterns across all the beam data rate requests by means of adaptive digital precoding to mitigate co-channel interference, per epoch (i.e., a timescale consisting of consecutive data frames) basis.

The portion of a satellite network that serves as an intermediate between the main network and the small networks used for distribution to other smaller channels is commonly referred to as backhaul. Specifically, the backhaul is the link between the network serving as the backbone for other networks and other sub-networks. In satellite communication backhaul is used to transmit data to a point from which it can be distributed over a network. For example, to deliver a live television program from Chicago to authorized satellite terminals around the country, the video signal would have to be backhauled to a terrestrial gateway. From the gateway the video signal is uplinked to a satellite and then downlinked to mobile base stations. The backhaul system may comprise known network topologies, such as, e.g., star, multi-star, mesh and hybrid star/mesh with bidirectional backhauling links. It follows that a choke in the backhaul can slow communications throughout the entire communication system.

To reduce choking, as the use of broadcast signals and multicast signals increases, a corresponding reuse of frequency occurs in order to conserve bandwidth for multiple access uplinks. Frequency reuse requires consideration of intra-beam and inter-beam interference. Signal processing, such as precoding and multiuser detection, and mitigation of cochannel beams have been attempted to deal with such interference.

The satellite typically has a link budget with different downlink (satellite to earth) and uplink (earth to satellite) parameters to reduce such interference. The interference is accounted for in beam modeling. For reliable multibeam broadband SATCOM, both channel gain and interference gains are considered and modulated as needed. Furthermore the complexity of the bent-pipe satellite payload is sensitive to the feed signals transmitted from the ground gateway. Even further, uplinks and downlinks vary due to instabilities induced by the payload and gateway changes over time and vary due to propagation amplitude and phase dispersion effects.

At least some current SATCOM beam models presume and input noiseless feeder links which are perfectly calibrated against channel power variations. But these models are incomplete and do not recognize the underlying actual and desired signal-to-interference-plus-noise ratio (SINR) dynamics.

Accordingly, it is desirable for beam models to consider uncertain linear state-space models which consider the energy difference between actual SINR and desired SINR. It is also desirable for the process to consider the energy of the control sequence in order to achieve improved reliability.

BRIEF SUMMARY OF THE INVENTION

In one embodiment the invention comprises a method for adaptively precoding the power of a channel of a ground terminal in communication with a satellite. The method comprises the steps of: calculating an actual SINR at the ground terminal for a channel satellite at a first predetermined epoch; estimating a terrestrial network flow rate based on a congestion measure from a respective terrestrial network; predicting a network congestion based upon at least one prior network flow rate and at least one end-to-end network performance measure; calculating a desired SINR at the ground terminal for the first epoch according to; calculating a precoding matrix adjustment according to $v^-_{lm}(k+1)=v^-_{lm}(k)+\alpha_{lm}[\gamma^-_{lm}{}^{req}(k)-\gamma^-_{lm}(k)]+u^w_{lm}(k)$; and adjusting the actual SINR according to the calculated precoding matrix adjustment for the predetermined time epoch to yield a desired SINR at the ground terminal.

In another embodiment the invention comprises a communication system for and a non-transitory computer readable medium for adaptively precoding the power of a channel of a mobile terrestrial network having ground terminal in communication with a satellite. The system and non-transitory computer readable respectively comprise: a plurality of ground terminals and a satellite in communication with the plurality of ground terminals, each of the ground terminals having a respective actual SINR, the system having a network flow rate and a network congestion; each of the ground terminals having a non-transitory computer readable medium configured to estimate the terrestrial network flow rate, to predict the network congestion and to autonomously calculate a desired SINR for the corresponding ground terminal and a non-transitory computer readable medium for therefor.

DETAILED DESCRIPTION OF THE INVENTION

The notations $(\cdot)^T$, $(\cdot)^*$ and $(\cdot)^H$ refer to the transpose, conjugate and conjugate transpose operators, respectively. The notation $E\{\cdot\}$ refers to the expected value operator. The notation $\{|\}$ represents the conditional expectation operator of the enclosed entities.

Links from the payload to the user terminals 24 are referred to herein as user links. Links from the gateway 25 to the satellite 21 payload are referred to herein as feeder links. A feeder link provides multiplexed point-to-point connection with the gateway 25.

SINR is the ratio of energy per bit to interference plus noise power spectral density at the ground receiver. The minimum required SINR for reliable operation is a function of the maximum tolerable bit-error rate and the particular modulation and coding scheme used. A typical minimum SINR for the original DVB-S standard is 8 dB. With the 2005 ratification of DVB-S2, a measured performance gain over DVB-S of about 30% with the same satellite 21 transponder bandwidth and emitted signal power is effected. Orthogonal Walsh-Hadamard sequences in the DVB-S2X standard allow for simultaneous estimation of channel state information of multiple beams 26, as discussed below.

Figure 1:
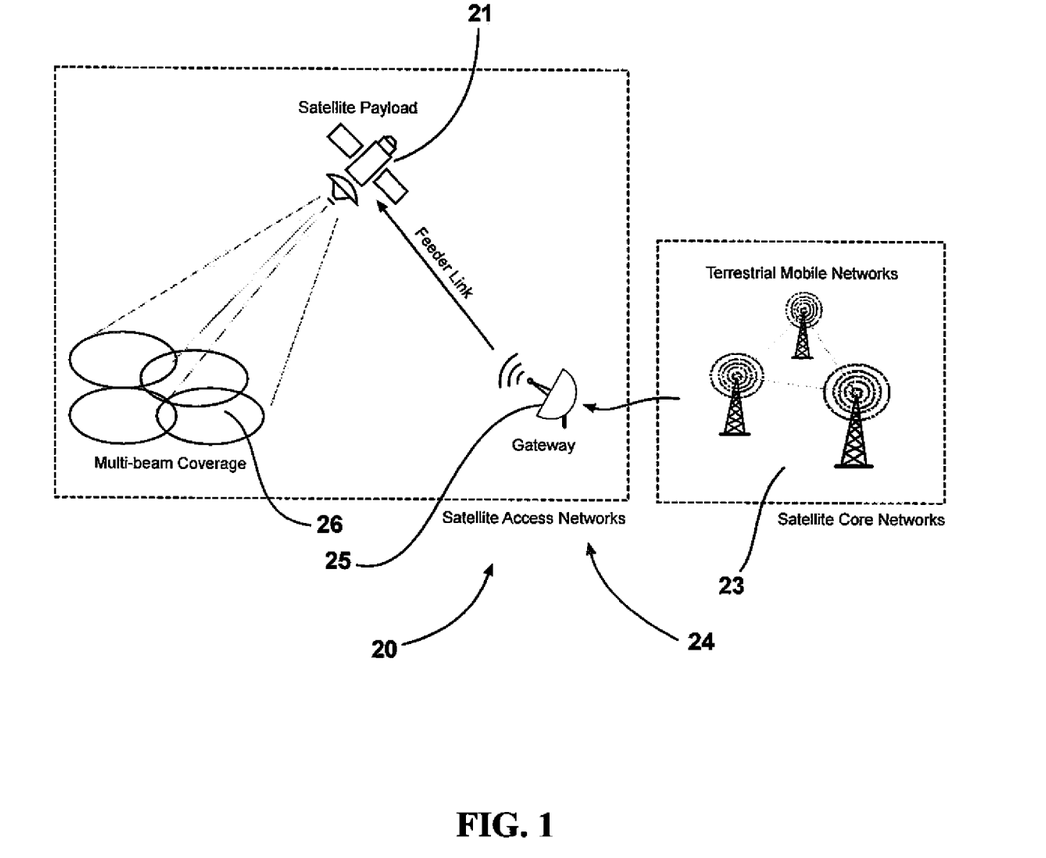
FIG. 1 is a schematic perspective view of a multibeam coverage communication system having user links and feeder links in satellite communication and being fed by terrestrial mobile networks.

Referring to FIG. 1, an illustrative and non-limiting multibeam SATCOM architecture comprises a communication system 20 having at least one ground gateway 25, a bent-pipe satellite 21 and a plurality of user terminals 24 in mutual communication. Omnipresent network 23 services coupled with the reuse of similar mobile terminals 24, higher data rates and overall capacity necessitates increasing frequency reuse among terrestrial and satellite 21 networks 23.

To conserve onboard resources while leveraging the flexibility of ground digital signal processing, ground based digital precoding may be utilized. Such ground based digital precoding facilitates the exchange of radiating element signals between the satellite 21 and the gateway 25. According to the present invention, the ground gateway 25 is adapted to analyze full frequency reuse patterns across all the beam 26 data rate requests by using adaptive digital precoding in order to mitigate co-channel interferences.

Such an illustrative, non-limiting communication system 20 may have a plurality of user terminals 24, designated as L user terminals 24, with one receiving antenna in each beam 26. The bent-pipe satellite 21 is equipped with an array fed reflector antenna, with N elements or feeds. These elements or feeds are combined to generate a predetermined beam 26 radiation pattern composed of M fixed beams 26. Digital precoding is performed and applied at the ground gateway 25, while a total of M single receiver antenna user terminals 24, one per beam 26, are simultaneously served by the satellite 21 relaying the data through the gateway 25. The use of one pilot signal per beam 26 is preferred, but not required. For orthogonal frequency-division multiplexing, all beams 26 radiate in the same frequency sub-band. Therefore, it is desirable to estimate the channel state for each beam 26 for user terminals 24 in multicast transmissions.

An overview of the present invention shows the following steps are performed. First, for each user-link beam 26 one separately determines: transient network 23 throughputs; end-to-end throughput and the network 23 congestion 41 measures. The next step is to determine that the evaluation of transient network 23 throughputs and network 23 congestion 41 measures has the respective desired signal-to-interference-plus-noise ratio (SINR) pertaining to the process of adapting waveform and communication modes associated with the satellite 21 feeder link in the presence of channel estimation uncertainty and propagation losses If one wishes to proactively predict the precoding, the ground gateway 25 may autonomously determine the adaptation 55 for precoding and/or beamforming at one or more ground gateways 25 responsive to uncertainties caused by frequency reuse patterns and channel estimation errors at each satellite 21 terminal or user terminal 24.

The user may then reconfigure both the adaptive control sequences and learning parameters to account for variations of terrestrial network 23 throughputs, terrestrial network 23 congestion 41 measures, uncertainties caused by frequency reuse patterns and channel gain estimation errors. Such reconfiguration provides for the reprogrammability of on-ground digital precoding or beamforming at the ground gateway 25.

Furthermore the user may responsively implement risk-averse precoding and/or beamforming based on Minimal-Cost-Variance (MCV) 52 control engineering principles to hedge against performance variations at each satellite 21 terminal or user terminal 24.

Examining the invention in more detail, a plurality, L, of user terminals 24, each with one receiving antenna in each beam 26 are disposed in predetermined ground locations. The bent-pipe satellite 21 payload is equipped with an array fed reflector antenna, with a plurality, N, of elements or feeds. Such elements or feeds are combined to generate a beam 26 radiation pattern composed of M fixed beams 26.

Digital precoding is performed and applied at the ground gateway 25, while a total of M single receive antenna user terminals 24, one per beam 26, is simultaneously served by the satellite 21 relaying the data through the gateway 25. In orthogonal frequency-division multiplexing, all beams 26 radiate in the same frequency sub-band. Consequently, user terminals 24 in multi-cast transmission are necessary to estimate the channel state information from each beam 26, using one pilot signal per beam 26.

For the streams received by L·M user terminals 24, the discrete equivalent baseband model for the received signals $y \in C^{ML \times 1}$ is denoted by: y=Hx+n.

(1)

where all of the transmitted signals; e.g., one per transmit feed element, are contained in $x \in C^{N \times 1}$ after being applied to the digital precoding. The user link channel $H \in C^{ML \times N}$ combines the N feeds and M·L user links (i.e., M·L>>N), whereas $n \in C^{ML \times 1}$ contains the noise terms of M·L user terminals 24 and the entries of n are assumed to be independent and identically distributed additive Gaussian noise with zero mean and variance equal to $\sigma_n^2$.

The channel column vector of the user terminal 24 l for l=1, . . . , L located at beam 26 m for m=1, . . . , M and denoted by $h_{lm} \in C^{N \times 1}$ represents the feed radiation patterns. The channel coefficients from each antenna feed element is estimated by the l-th user terminal 24 in the m-th beam 26, are contained in $h_{lm}$, whose snapshot estimations are determined by:

$$i.\ h_{lm} = \frac{G_R e^{j\psi_{lm}}}{4\pi \frac{D_{lm}}{\lambda}} a_{lm}. \qquad (2)$$

where $D_{lm}$ is the distance between user terminal 24 l in beam 26 m and the satellite 21 payload, A is the carrier wavelength associated with the beam 26 m, and $G_R$ is the receiver antenna gain at user terminal 24 I. The time-varying phase due to the beam 26 radiation pattern and radio propagation is defined by $\psi_{lm}$, and the transmit array steering vector is given by: $a_{lm} \in C_{N \times 1}$.

The channel column vectors for L user terminals 24 in the m-th beam 26 transmissions is given by:

$$H_m = [h_1 m \ldots h_{Lm}]T \in C_{L \times N} \qquad (3)$$

Similarly, the channel matrix for M fixed beams 26 is governed by:

$$a.\ H = \begin{bmatrix} H_1 \\ \vdots \\ H_M \end{bmatrix} \in \mathbb{C}^{ML \times N}. \qquad (4)$$

The accessibility of all the terminal 24 reports at the ground gateway 25 provides dynamic resource allocation, including adaptive beam 26 patterns and consideration of per-feed power constraints. The feeder link is useful for evaluating quality of signal provided to all of the associated user terminals 24. Multi-cast precoding must balance tradeoffs between two competing requirements: the energy of the difference between the successive actual/desired SINR 30, 31 levels and the energy of the control sequences. Minimizing the squared Euclidean distances among $\bar{\gamma}_{lm}(k)$ and $\bar{\gamma}_{lm}^{req}(k)$ mandates the use of more transmission power according to $\in lm \|Llmxlm(k)\|^2$; $\in lm \in R+$ for certain $L_{lm}$, [1-1]. But, the competing requirement mandates ensuring per-feed power constraints as necessary to mitigate inherent inter-feeder link interferences according to $\|B_{lm}u_{lm}(k)\|^2$. The present invention seeks to overcome this tradeoff as found in the prior art. For purposes of this invention, the received signal at user terminal 24 M is decomposed into three components: desired signal; multi-beam 26 interference signal and noise. Adaptive SINR building blocks are optionally composed of MCV-based control policy for iterative desired and received SINR dynamics per beam 26.

The channel matrices and column vectors can be used for precoding. Precoding is used to reduce cochannel interference during high frequency reuse.

Figure 2:
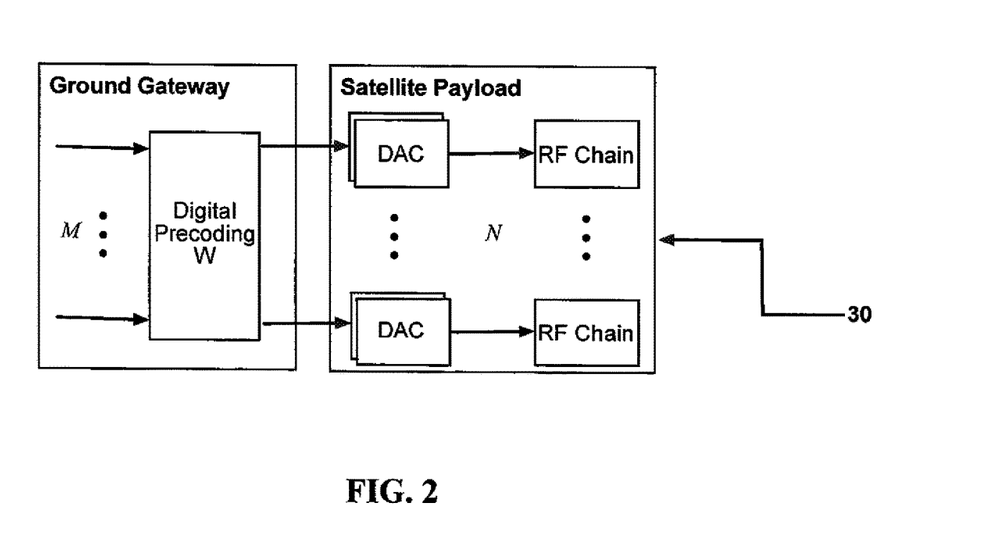
FIG. 2 is a block diagram of a digital precoding architecture.

Referring to FIG. 2, during multi-cast transmission with the user terminals 24 at each beam 26 detecting the same information, the transmit symbols, $s \in C^{M \times 1}$ are believed to be mutually uncorrelated and designated as having power equal to 1; e.g., $E\{ss^H\}$=Im prior to precoding. These transmit symbols are adaptively adjusted in real time based on the digital precoding matrix 50, $W \in C^{N \times M}$, which in turn is to be shown as $$i \cdot x = Ws \qquad (5)$$

wherein $x \in C^{N \times 1}$ are the transmitted signals at all feeds. This architecture is valid when the number of radio frequency (RF) chains N driven by digital-to-analog converters (DAC) is at least equal to the number of data streams M.

The gateway 25 is configured to provide an early warning in case a user terminal with an unduly low signal-to-interference-plus-noise ratio (SINR) is detected which constrains the achievable data rates at each beam 26. The actual SINR 30 for user terminal 24 l in beam 26 m at epoch k is given by:

$$1.\ \gamma_{lm}(k) = \frac{|h_{lm}^H(k)w_m(k)|^2}{\sum_{q \neq l}^{M} |h_{lm}^H(k)w_q(k)|^2 + \sigma_n^2(k)} \qquad (6)$$

where for each epoch k, $w_m$ and $w_q$ are the mth and qth column vectors of W, respectively and $\sigma_n^2$ is the white noise power at the receiver of user terminal 24 l in beam 26 m.

Figure 3:
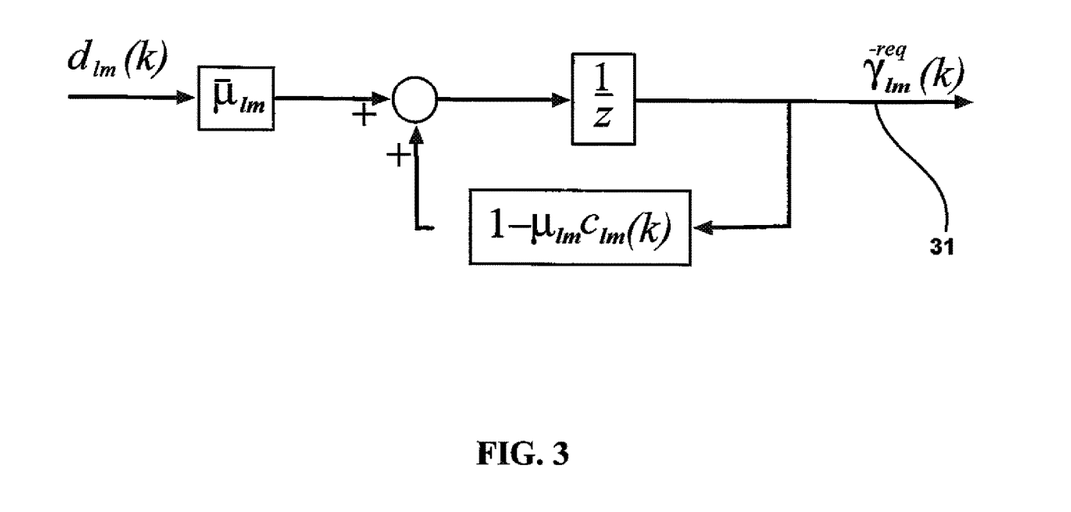
FIG. 3 is a block diagram of control algorithm for determining adaptive flow rates.

Referring to FIG. 3, the actual throughput of multicast transmission at ground gateway 25 is constrained by the primary terrestrial network 23 flowrate in bits per second per Hertz. Thus is one cannot download signals from the satellite 21, if there is congestion 41 or choking at the gateway 25 or feeder links.

The network 23 flow rate 40 at user terminal 24 L in beam 26 m at epoch k, is modeled as a white Gaussian random sequence with a system having no network 23 congestion 41 setting clm$^{(k)}$=0. Thus, a constructive response for network 23 flow rate 40, $r_{lm}(k)$ at user terminal 24 l in beam 26 m at epoch k by means of principles of reinforcement learning is used to reduce congestion 41 according to:

i. $r_{lm}(k+1) = r_{lm}(k) + \mu_{lm}[d_{lm}(k) - c_{lm}(k)r_{lm}(k)]$ \hfill (7)

wherein $\mu_{lm}$ is a learning parameter, $c_{lm}(k)$ is a measure of the amount of congestion 41 in the primary terrestrial mobile network 23 under consideration at epoch k, and $d_{lm}(k)$ is modeled as a white Gaussian random sequence with a mean $m_d$ and a variance $\sigma_d^2$ so that the parameter $d_{lm}(k)$ controls the size of the rate increase per iteration. If there is no network 23 congestion 41; i.e., $c_{lm}(k)=0$, the network 23 flow rate 40 is increased by $\mu_{lm}d_{lm}(k)$, where $\mu_{lm}$ is based upon network 23 congestion 41 and adaptive rate increases at the gateway 25.

For user terminal l in beam 26 m at epoch k, the gateway 25 repeatedly updates the incumbent network 23 congestion 41 by the quantity, $c_{lm}(k)$ according to:

i. $c_{lm}(k+1) = [c_{lm}(k) + \alpha_m(r_{lm}(k) - r_{e^2e}(k))]^+$ \hfill (8)

wherein $\alpha_m > 0$ is a small constant subject to the congestion 41 monitoring module at the network 23 access provider, $[z]^+ = \max\{z, 0\}$ and $r_{e^2e}(k)$ is the end-to-end network 23 rate at epoch k.

The congestion 41 measure, $c_{lm}(k)$ is an integrator based upon the mismatch between $r_{lm}(k)$ and $r_{e^2e}$, and, per the preceding equation, is increased if the mismatch in in $r_{lm}(k) - r_{e^2e}(k)$, weighted by $\alpha_m$, is positive, and is decreased if the mismatch is less than or equal to zero Through multiple iterations, the congestion 41 measure $c_{lm}(k)$ will drive potential mismatches to approach zero, yielding full network 23 utilization; with $r_{lm} = r_{e^2e}$.

Furthermore, the adaptation 55 of corresponding SINR levels may be based upon the actual network 23 flow rates 40, in order to properly incorporate the network 23 congestion 41 measures. The SINR level, $\gamma_{lm}^{req}(k)$ for user terminal 24 l in beam 26 m at epoch k is related to $r_{lm}(k)$ is given by:

a. $r_{lm}(k) = \frac{1}{2}\log_2[1 + \gamma_{lm}^{req}(k)]$. \hfill (9)

The data rates requested by user terminals 24 under uncertainty are subject to time varying channels and the presence of the primary terrestrial mobile network 23 dynamics. Therefore, it is preferable for the gateway 25 to include a buffer zone, namely $\rho_{lm}$ and $0 < \rho_{lm} \le 1$, to account for the fact that actual SINR 30 estimates could potentially be less than the desired SINR 31 values as set forth in:

a. $\frac{r_{lm}(k)}{\rho_{lm}} = \frac{1}{2}\log_2[1 + \gamma_{lm}^{req}(k)]$. \hfill (10)

Figure 4:
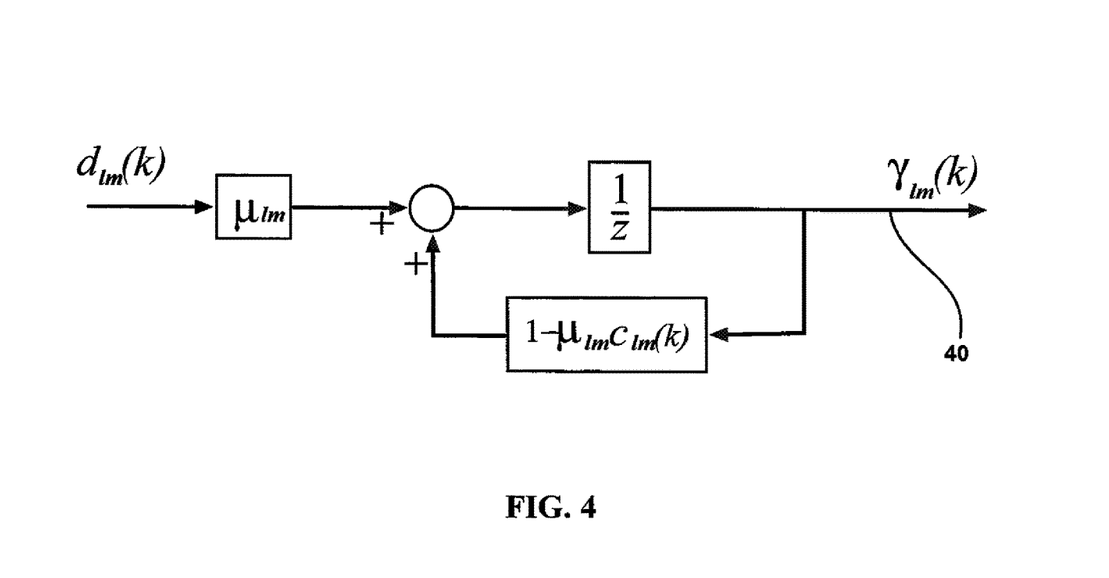
FIG. 4 is a block diagram of a discrete time system for determining desired a SINR.

Referring to FIG. 4, the given values of $r_{lm}(k)$ may be used to determine the requirements on SINR per user terminals 24, $\gamma_{lm}^{req}(k)$ at epoch k. In this regard, the gateway 25 constructs transmit powers and precoding requirements for the feeder link and the feed signals on the satellite 21 antenna such that the resulting SINR levels, $\gamma_{lm}(k)$, as measured by Eq. 6, will approach the desired SINR 31 values, $\gamma_{lm}^{req}(k)$, as governed by Eq. 10.

The decibel value of $\gamma_{lm}^{req}(k)$ at epoch k may be calculated as $\bar{\gamma}_{lm}^{req}(k)$, $10 \log_{10}\gamma_{lm}^{req}(k)$, to provide a closed form approximation of the network 23 flow rate 40:

1. $r_{lm}(k) \approx \frac{\rho_{lm}}{20}\log_2 10 \cdot \bar{\gamma}_{lm}^{req}(k) = \frac{\bar{\gamma}_{lm}^{req}(k)}{\kappa_{lm}}$ \hfill (11)

wherein $\kappa_{lm} \triangleq \frac{20}{\rho_{lm}\log_2 10}$.

As such, this approximation allows $r_{lm}(k)$, governed by Eq. 11, to deduce the desired SINR 31 level, $\bar{\gamma}_{lm}(k)$ to capture the dynamics of $r_{lm}(k)$ according to the variability of congestion 41 at the primary terrestrial mobile network 23 connected with the gateway 25 a. $\bar{\gamma}_{lm}^{req}(k+1) = [1 - \bar{\mu}_{lm}C_{lm}(k)]\bar{\gamma}_{lm}^{req}(k) + \bar{\mu}_{lm}d_{lm}(k)]$ \hfill (12)

wherein $\bar{\mu}_{lm} \triangleq \frac{\mu_{lm}}{\kappa_{lm}}$.

Figure 5:
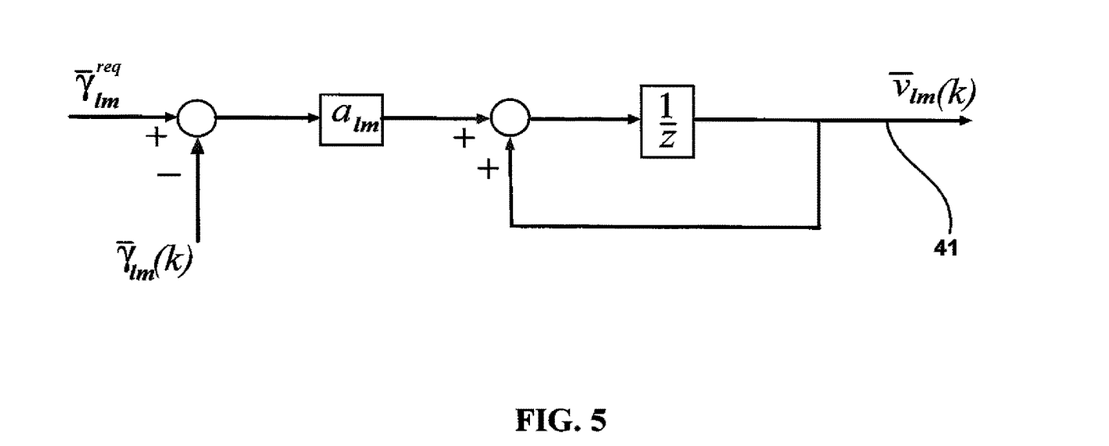
FIG. 5 is a block diagram of an adaptive precoding scheme.
Figure 6:
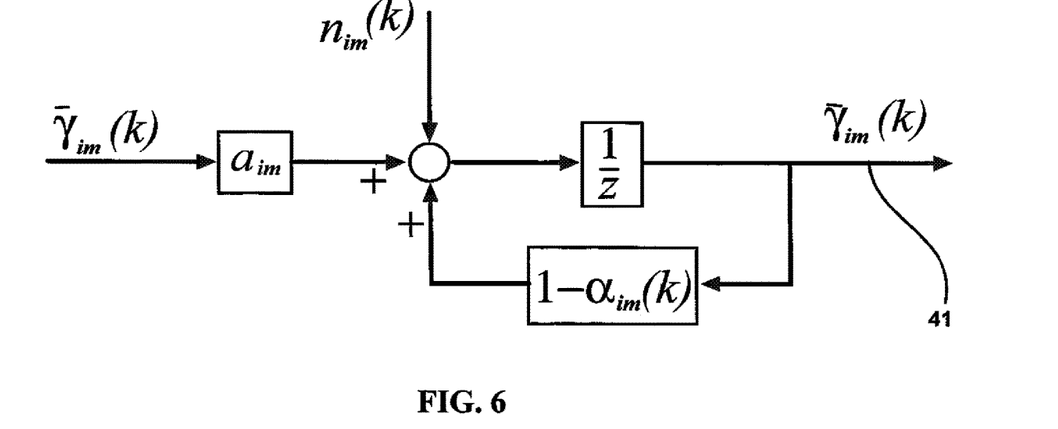
FIG. 6 is a block diagram of a direct realization of an actual SINR adaptation.

Referring to FIG. 5 and FIG. 6, the inter-beam 26 interference at user terminal 24 l in beam 26 m at epoch k is given by:

$$I_{lm}(k) \triangleq \sum_{q \neq l}^{M} |h_{lm}^H(k)w_q(k)|^2 + \sigma_n^2(k). \tag{13}$$

The actual channel $h_{lm}(k)$ at epoch k may be modeled by an equation which accounts for an uncertain region around the channel estimate; e.g., $|h_{lm}(k+1)|^2 = |h_{lm}(k)|^2 h^o_{lm}(k)$ \hfill (14)

wherein $h^o_{lm}(k)$ is a unit mean random variable determined by channel estimations with pilot symbols from corresponding waveform structures.

During downlink transmissions, the scaling factor, $\beta_{lm}(k)$ at epoch k that modulates the SINR for user terminal 24 l in beam 26 m is desirable in order to promote reliable communication. This scaling factor can be determined according to:

i. $\beta_{lm}(k) \triangleq \frac{|h_{lm}(k)|^2}{I_{lm}(k)}$. \hfill (15)

And an upper bound precoding value $w_{lm}$ at epoch k can be used to overcome inter-beam 26 interference at user terminal 24 l in beam 26 m; according to:

a. $\gamma_{lm}(k) = \beta_{lm}(k)|w_{lm}(k)|^2$. \hfill (16)

The actual SINR 30 together with the linear precoding design for $w_{lm}(k)$ may be transposed the decibel scale by:

a. $\bar{\gamma}_{lm}(k) = \bar{\beta}_{lm}(k) + \bar{v}_{lm}(k)$ \hfill (17)

wherein $\bar{\beta}_{lm}(k)$ is now referred as the effective channel gain for the user link at l in beam 26 m at epoch k.

The iterative process for the effective channel gain is governed by the first-order Markov random model according to:

1. $\bar{\beta}_{lm}(k+1) = \bar{\beta}_{lm}(k) + n_{lm}(k)$ \hfill (18)

wherein at epoch k, $n_{lm}(k)$, $10 \log_{10} h^o_{lm}(k) - 10 \log_{10} l_{lm}(k)$ is a zero-mean random variable independent of the precoding values, $\bar{v}_{lm}(k)$ having variance $\sigma_{lm}$ and $n_{lm}(k)$ is determined by $h_{lm}$ and $l_{lm}^o$ as described above.

Then the iterative adaptation 55 for the actual SINR 30 level can be given by:

a. $\gamma_{lm}(k)\bar{\gamma}^-_{lm}(k+1)=(1-\alpha_{lm})\bar{\gamma}^-_{lm}(k)+\alpha_{lm}\bar{\gamma}_{lm}^{req}(k)+n_{lm}(k)$. (19)

Figure 8:
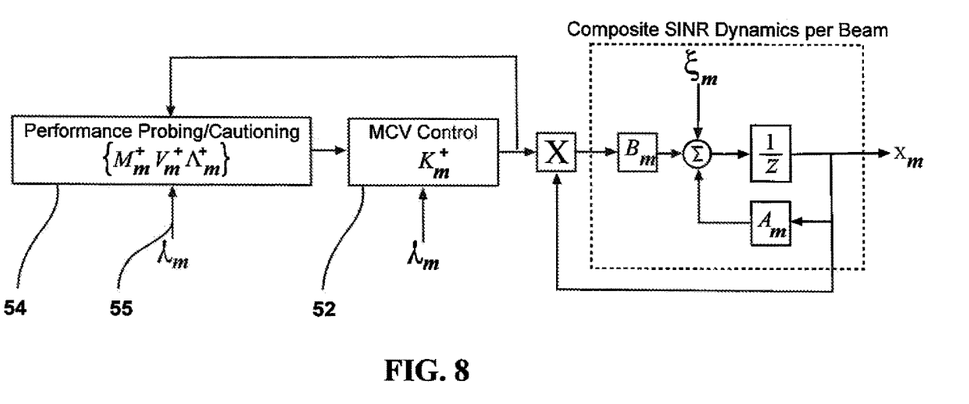
FIG. 8 is a block diagram of a minimal cost variance control algorithm.

Referring to FIG. 8, preferably one considers unexpected adverse events, collectively referred to herein as risks. Accordingly, both the desired SINR 31 and actual SINR 30 are preferably treated as subject to network 23 congestion 41 and frequency reuse induced uncertainties. The particular gateway 25 under consideration is set according to the precoding matrix 50 $(w_{lm}(k)) \in \mathbb{C}^{N \times M}$ or) equivalently $(\bar{v}_{lm}(k)) \in \mathbb{R}_+^{N \times M}$ in the decibel scale at epoch k such that the actual SINR 30 levels $\{\bar{\gamma}^-_{lm}(k)\}$, as given by Eq. 19 will approach the desired SINR 31 of $\{\bar{\gamma}_{lm}^{req}(k)\}$, as determined by Eq. 12.

Accordingly, the dynamics of inter-beam interference and channel gain may be determined by: the iterative scheme according to the first-order Markov random model:

$\beta^-_{lm}(k+1)=\beta^-_{lm}(k)+n_{lm}(k)$ (20)

wherein at epoch k, $n_{lm}(k)$, $10 \log_{10} h^0_{lm}(k) - 10 \log_{10} l^0_{lm}(k)$ is a zero-mean random variable with variance $\sigma_{lm}^2$ and is independent of the precoding values, $v^-_{lm}(k)$.

Figure 7:
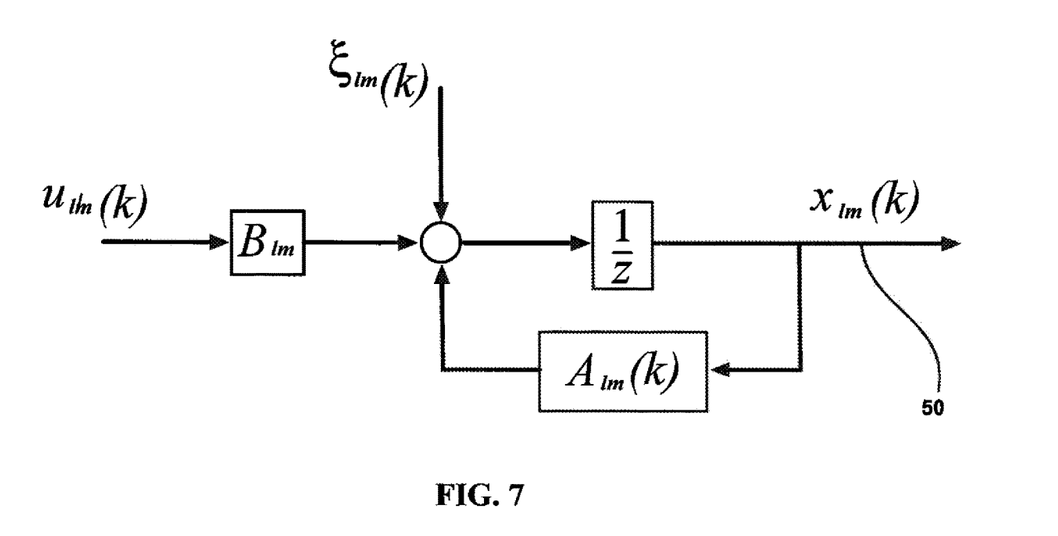
FIG. 7 is a block diagram of a cognitive dynamic subsystem for precoding.

Referring to FIG. 7, at the gateway 25, reinforcement learning may be advantageously employed by interacting with the terrestrial mobile network 23 environments. The reinforcement learning uses feeder link provisioning that trains the precoding algorithms at the gateway 25 by using network 23 congestion 41 measures in combination with desired and received SINR measurements.

A control sequence may be introduced to drive the actual SINR 30, SINR, $\bar{\gamma}^-_{lm}(k)$ towards the desired SINR 31, $\bar{\gamma}_{lm}^{req}(k)$ in a finite time. Using this learning, a compositional structure which unexpectedly provides for precoding at the gateway 25, consists of cognitive control $u_{lm}(k)$ together with the adaptive learning parameters $\alpha_{lm}$ and $\mu_{lm}$ for user terminal l in beam 26 m; such that:

$x_{lm}(k+1)=A_{lm}(k)x_{lm}(k)+B_{lm}u_{lm}(k)+\xi_{lm}(k)$ (21)

wherein the control matrix $B_{lm}$ is considers a degree of design freedom such that:

$$B_{lm}u_{lm}(k) \triangleq \begin{bmatrix} u^w_{lm}(k) \\ u^r_{lm}(k) \end{bmatrix}.$$

The adaptive precoder 51 scheme preferably considers that imperfect observations in a controlled dynamic subsystem have SINR estimations noises with random distributions. To account for noisy measurements, one may consider that the adaptive precoder 51 formula is governed by:

$v^-_{lm}(k+1)=v^-_{lm}(k)+\alpha_{lm}[\bar{\gamma}_{lm}^{req}(k)-\bar{\gamma}^-_{lm}(k)-\bar{\gamma}^-_{lm}(k)]+u^w_{lm}(k)$ (22)

and that coupling the cognitive control provides the adaptation 55 of the network 23 flow rate 40 according to:

$r_{lm}(k+1)=r_{lm}(k)+\mu_{lm}[d_{lm}(k)-c_{lm}(k)r_{lm}(k)]+\kappa u^r_{lm}(k)$. (23)

The iterative learning for the adaptation 55 of precoders 51 and of network 23 flow rates 40 advantageously and proactively reduce interbeam interference by reducing network 23 fluctuations. This arrangement provides for more continuous and efficient transmission at the feeder link of the ground gateway 25 than known prior art systems.

A performance measure of the multi-cast precoding between epochs, $J_{lm}$ is tailored to the aforementioned competing tradeoffs of: 1) the energy of the difference between the successive actual SINR 30 and the desired SINR 31 level according to $\bar{\lambda}_{lm}(k)$ and $\bar{\lambda}_{lm}^{req}(k)$ and 2) the energy of the control sequences according to to $\varepsilon lm\lambda L lmxlm(k)\lambda^2$; $\varepsilon lm \in R+$ for certain $L_{lm}$, [1–1]. The specific performance measure is a chi-squared random variable with stochastic variabilities for risk sensitive learning of multi-cast precoding at the gateway 25. This approach provides the benefit over prior art methods relying only upon average quantities that either $\bar{\lambda}_{lm}(k)$ and $\bar{\lambda}_{lm}^{req}(k)$ or $\varepsilon lm\lambda L lmxlm(k)\lambda^2$ can be weighted as desired for the particular system under consideration wherein the state and control weighting matrices are respectively given by:

$$Q_{lm} \triangleq \begin{bmatrix} \epsilon_{lm} & -\epsilon_{lm} \\ -\epsilon_{lm} & \epsilon_{lm} \end{bmatrix}; R_{lm} \triangleq B_{lm}^T B_{lm}. \quad (24)$$

The beam patterns adaptation 55 is performed on ground. The beams 26 are then uploaded over the feeder link to the satellite 21 payload. The outputs of the satellite 21 payload are multi-cast transmissions to multiple spot beams 26, each of which is responsible for broadband transmissions to its predetermined user terminals 24.

Optionally, a Minimal-Cost-Variance (MCV) 52 control may be used to characterize the chi-squared distribution of extreme events. The MCV 52 may specifically be used to determine extreme deviations from the mean-variance of the composite performance measure for precoding of beam 26 m and thereby minimize the variance of $Jm(n_0)$ $E\{J_m^2|Z_m(n_0)\}-E^2\{J_m(n_0)|Z_m(n_0)\}$, wherein the mean variance is given by:

$Jm=\Sigma 0\{x^T_m(n)Q_{m\times m}(n)+u_m^T(n)R_{m u m}(n)\}n=n+1$ and the mean constraint is given by: $h_m(n_0, Z_m(n_0))=m_m(n_0)+x^T_m(n_0)M_m(n_0)x_m(n_0)$.

According to the present invention $h_m(no_0,Z_m(n_0))$, should provide that the actual SINR 30 deviations from the desired SINR 31 levels also provides for adequate per-feed power constraints. Therefore $h_m(n_0,Z_m(n_0))$ is selected such that the mean constraint is greater than:

$$\inf_{u_m(n_0), \ldots, u_m(n_T-1)} E\{J_m(n_0) | Z_m(n_0)\}.$$

Accordingly, the variance cost can be determined by:

$$VC_m(n, Z_m(n)) = \quad (25)$$
$$\min_{g_m(n),\lambda_m(n)} \{4\beta_m^T(n)S_m(n)\Xi_m S_m(n)\beta_m(n) + E\{(\xi_m^T(n)S_m(n)\xi_m(n))^2\} -$$
$$Tr\{S_m(n)\Xi_m\} + \beta_m^T(n)V_m(n+1)\beta_m(n) + Tr\{V_m(n+1)\Xi_m\} +$$
$$V_m(n-1) + 4\lambda_m(n)[m_m(n+1) + gmT(n)R_m gm(n) +$$
$$\beta_m^T(n)S_m(n)\beta_m(n) + Tr\{S_m(n)\Xi_m\} - m_m(n) - x_m^T(n)M_m(k)x_m(n)]\}.$$

The adaptive SINR adjustment strategy at the ground gateway 25 described herein may be used to minimize the aforementioned variance cost according to:

$g^*_m(n)=K_m^*(n)x_m(n),u_m(n)$ (26)

wherein, for $n_0 \le n \le n_T-1$ $K_m^*(n)=-[B_m^T\Lambda_m(n)B_m+\lambda_m(n)R_m]^{-1}B_m^T\Lambda_m(n)A_m(n)$ and $\Lambda_m(n)=S_m(n)\equiv S_m(n)+\frac{1}{4}(V_m(n+$ 1)+$\lambda_m(n)$ $S_m(n)$ and the precoding adjustment of, e.g., gm(n), gm(n,$Z_m$(n)), $n_0 \leq n \leq n_T-1$, is such that:

$$E\{J_m^2(n)|Zm(n\{)\}-E|^2\{Jm\{\}-n)Z_m(n)\}+4\lambda_m(n)[E \\ J_m(n)Z_m(n)h_m(n,Z_m(n))]  \quad (27)$$

is minimized, and wherein 4 is simply a convenient pre-multiplier.

The optimal variance 54 of the SINR adjustment is then given by:

$$v_m^*(n)=v_m^*(n+1)+Tr\{V_m^*(n+1\equiv_m\}+E\{(\xi_m^T(n)S_m(n) \\ \xi_m(n))^2\}-Tr^2\{S_m(n)\equiv_m\}  \quad (28)$$

wherein $A^*_m(n) \triangleq A_m(n)+B_m K^*_m(n)$ and $n_0 \leq n \leq n_\lambda - 1$.

Figure 9:
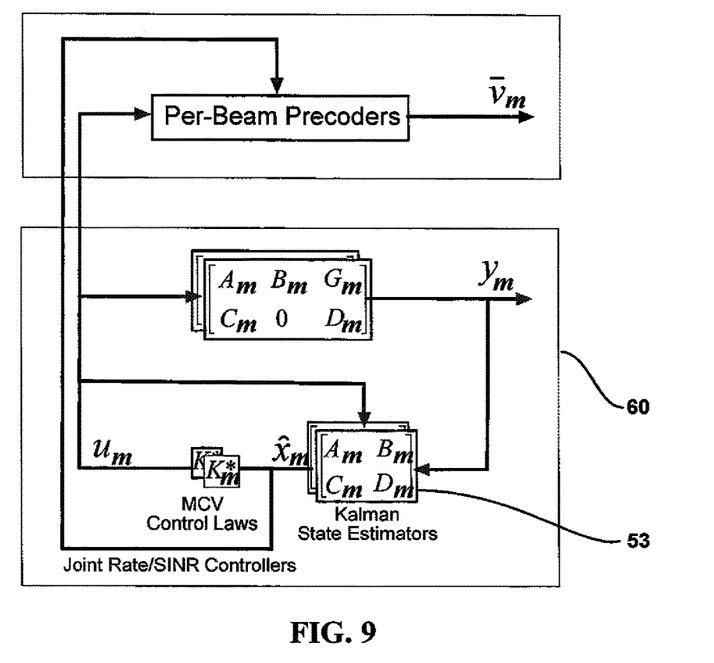
FIG. 9 is a block diagram of a multi-cast multi-beam SATCOM system.
Figure 10:
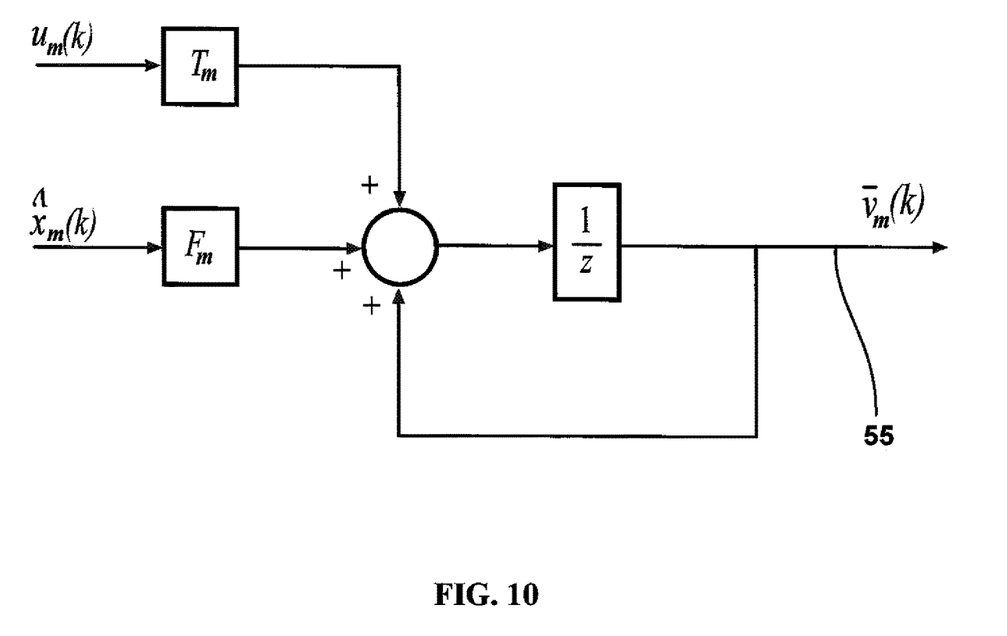
FIG. 10 is a block diagram of a network congestion aware precoding diagram.

Referring to FIG. 9-FIG. 10, and using the separation principle, optimal control and estimation problems can be independently solved. The separation principle allows one of skill to transform a filtered estimate covariance into a predicted error covariance. This approach further provides a semi-recursive analysis of the gateway 25 with which the filtered estimate error covariance, $P_m(n-1|n-1)$; which can then be translated into the predicted estimate error covariance by:

$$P_m(n-1|n-1)=L_m(n-1)\Theta_m L^T_m(n-1)+[I-L_m(n-1)C_m] \\ P_m(n-1|n-2)[I-L_m(n-1)C_m]^T.  \quad (29)$$

A Kalman filter can be used to estimate the variance of the actual SINR 30 and hence the optimal variance 54 using a time-based linear quadratic estimation.

The gateway 25 can then compute the Kalman gain 54 as:

$$L_m(n)=P_m(n|n-1)C_m^T[C_m P_m(n|n-1)C_m^T+\Theta_m]^{-1}.  \quad (30)$$

And the adaptation 55 of the precoders 51 for each beam 26 m and m=1, ..., M is given by:

$$v^-_m(k+1)=^-v_m(k)+F_m x^-x_m(k)+T_m u^\wedge_m(k)  \quad (31)$$

The ground gateway 25 may then compute the Kalman gain 54 as:

$$L_m(n)=P_m(n|n-1)C_m^T[C_m P_m(n|n-1)C_m^T+\Theta_m]^{-1}.  \quad (32)$$

As stated above, the Kalman estimation of both the desired and actual SINR 30 levels at beam 26 m is done at the ground gateway 25, for any given initial system state $x^\wedge_m(n_0|n_0)$.

Using the Kalman estimate, the optimal variance 54 of the composite performance measure for precoding of beam 26 may given by:

$$V^*_m(n)=A^{*T}_m(n)[4S_m(n)\equiv_m S_m(n)+V^*_m(n+1)]A^*_m(n)  \quad (33)$$

together with:

$$v_m^*(n)=v_m^*(n+1)+Tr\{V_m^*(n+1\equiv_m\}+ \\ E\{(\xi_m^T(n)\xi_m(n))^2\}-Tr^2\{S_m(n)\equiv_m\}$$

wherein $A^*_m(n) \triangleq A_m(n)+B_m K^*_m(n)$ and $n_0 \leq n \leq n_T-1$.

While the invention has been described as a method for precoding the power of a channel of a ground terminal 24, the invention is not so limited. In another embodiment the invention comprises a non-transitory computer readable medium 60 suitable for and configured to carry out the computations and determinations of any of the foregoing, including only as limited by the claims below, algorithms, calculations, estimates such as but not limited to Kalman estimates, iterative/recursive exercises, solving of equations/ inequalities and determinations of any of the parameters listed in the claims below.

Exemplary non-transitory computer readable media 60 are physical, transferable, reproducible, may comprise all computer readable media except for a transitory propagating signal and particularly include flash drives, CD's, DVDs, internal/external hard drives, more particularly internal/external solid state hard drives, and further exclude RAM, volatile memory requiring power for data storage, signals and effervescent carrier waves. In an alternative embodiment, transitory computer readable media 60 may also be used.

To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a signal processor or a block of random access memory, hard disk, or the like) or multiple pieces of hardware. Similarly, the programs may be standalone programs, may be incorporated as subroutines in an operating system, may be functions in an installed software package, and the like. It should be understood that the various embodiments are not limited to the arrangements and instrumentality shown in the drawings.

What is claimed is:

1. A method for adaptively precoding the power of a channel of a ground terminal in communication with a satellite, the method comprising the steps of:
   calculating an actual signal-to-interference-plus-noise ratio (SINR) at the ground terminal for a channel satellite at a first predetermined epoch;
   estimating a terrestrial network flow rate based on a congestion measure from a respective terrestrial network;
   predicting a network congestion based upon at least one prior network flow rate and at least one end-to-end network performance measure;
   calculating a desired SINR at the ground terminal for the first epoch according to;
   calculating a precoding matrix adjustment according to
   $v^-_{lm}(k+1)=^-v_{lm}(k)+\alpha_{lm}[\gamma_{lm}^{req}(k)-\gamma^-_{lm}(k)]+u^w_{lm}(k)$;
   wherein,
   $\gamma$ is the discrete equivalent baseband model for the received signals,
   lm is the number of user streams L multiplied by the number of data streams M,
   k is a counter for particular epochs,
   $\alpha$ is a small constant greater than 0 subject to the congestion monitoring module at the network access provider,
   $\mu_{lm}$ is a learning parameter,
   w is an upper bound precoding value,
   the notation $\{*|*\}$ represents the conditional expectation operator of the enclosed entities and
   adjusting the actual SINR according to the calculated precoding matrix adjustment for the predetermined time epoch to yield the desired SINR at the ground terminal.

2. A method according to claim 1 where the actual SINR at the ground terminal is determined according to:

$$\gamma_{lm}(k) = \frac{|h_{lm}^H(k)w_m(k)|^2}{\sum_{q \neq l}^{M} |h_{lm}^H(k)w_q(k)|^2 + \sigma_n^2(k)},$$

and the desired SINR at the ground terminal is determined according to:

$$\gamma_{lm}^{req}(k+1)=[1-\mu l_m c_{lm}(k)]\gamma_{lm}^{req}(k)+^-\mu l_m d_{lm}(k)]$$

wherein $$\bar{\mu}_{lm} \triangleq \frac{\mu_{lm}}{\kappa_{lm}},$$

$\gamma_{lm}{}^{req}(k)$ is the required SINR level at epoch k,
$\gamma'_{lm}(k)$ is the desired SINR level at epoch K,
the superscript H refers to the conjugate transpose operator,
the superscript req refers to a required value of that parameter,
$\sigma_n^2$ is the variance,
n is the particular feed from the satellite,
$d_{lm}$ is the distance between user the terminal and the satellite payload,
$\lambda$ is the carrier wavelength and
$c_{lm}(k)$ is a measure of the amount of congestion in the primary terrestrial mobile network under consideration at epoch k,
$w_{lm}$ is an upper bound precoding value and
$h_{lm}$ is a unit mean random variable determined by channel estimations.

3. A method according to claim 2 further comprising the step of calculating an optimal variance between the actual SINR and the desired SINR and precoding a calculated SINR adjustment to match the optimal variance.

4. A method according to claim 3 further comprising the step of predicting a covariance of the optimal variance according to:

$$P_m(n-1|n-1) = L_m(n-1)\Theta_m L^T_m(n-1) + [I - L_m(n-1)C_m]$$
$$P_m(n-1|n-2)[I - L_m(n-1)C_m]^T$$

wherein
$P_m(n-1|n-1)$ is the predicted covariance,
$L_m$ is the Kalman gain,
$\Theta_m$ is the covariance matrix of the measurement noise, and
$C_m$ is $I_{2\times 2}$.

5. A method according to claim 4 further comprising the step of minimizing the optimal variance optimal according to a Minimal-Cost-Variance Control analysis.

6. A method according to claim 5 wherein the Minimal-Cost-Variance is minimized according to $g^*_m(n) = K_m^*(n)x_m(n)$, $u_m(n)$
wherein
$x_m$ is the composite system state and control input vector,
$K_m$ is the Kalman state estimate, and
$g^*_m(n)$ is the precoding adjustment.

7. A method according to claim 6 wherein the Minimal-Cost-Variance is further minimized according to:

$$E\{J_m^2(n)|Zm(n)\} - E|^2\{Jm(ngm(n))4\lambda_m(n)[E\,J_m(n)Z_m(n)h_m(n,Z_m(n))].$$

wherein
E is the conditional expectation operator
Jm is the composite performance measure of a particular beam and
Zm is the datum for a multicast precoder.

8. A method according to claim 7 further comprising the steps of calculating a first Kalman gain for a second predetermined epoch and precoding a respective channel power to match the Kalman gain at a second epoch, the second epoch occurring after the first epoch, to yield an estimate of a desired SINR adjustment.

9. A method according to claim 8 wherein the first Kalman gain is determined according to:

$$L_m(n) = P_m(n|n-1)C_m^T[C_m P_m(n|n-1)C_m^T + \Theta_m]^{-1}.$$

10. A method according to claim 9 further comprising the step of comparing the first Kalman gain to a desired SINR adjustment and adjusting the desired SINR to match the first Kalman gain.

11. A method according to claim 9 further comprising the step of determining a second Kalman gain, the second Kalman gain being less than the first Kalman gain and adjusting the desired SINR to match the second Kalman gain.

12. A method for adaptively precoding the power of a channel of a mobile terrestrial network having ground terminal in communication with a satellite; the method comprising the steps of:
 a. selecting a first ground terminal from a plurality of ground terminals, each of the ground terminals being in communication with a common satellite;
 b. calculating an actual SINR at the first ground terminal for a satellite channel at a first predetermined epoch;
 c. estimating a terrestrial network flow rate based on a congestion measure from a respective terrestrial network;
 d. predicting a network congestion based upon at least one prior network flow rate and at least one end-to-end network performance measure;
 e. calculating a desired signal-to-interference-plus-noise ratio (SINR) at the first ground terminal based on the network flow rate and congestion measure for the first epoch;
 f. calculating an optimal variance between the actual SINR and desired SINR; and
 g. adjusting the actual SINR according to the optimal variance of the preceding step.

13. A method according to claim 12 comprising the step of estimating plural network flow rates from a respective plurality of ground terminals.

14. A method according to claim 13 further comprising the steps of calculating an actual SINR at the first ground terminal for the satellite channel at a second predetermined epoch; and
repeating steps c, d, e, f, and g for the second epoch while retaining the actual SINR calculated at the first epoch.

15. A communication system for adaptively precoding power of a channel of a mobile terrestrial network having ground terminal in communication with a satellite; the system comprising:
 a plurality of ground terminals and a satellite in communication with the plurality of ground terminals, each of the ground terminals having a respective actual signal-to-interference-plus-noise ratio (SINR) the system having a network flow rate and a network congestion;
 each of the ground terminals having a non-transitory computer readable medium configured to estimate the terrestrial network flow rate, to predict the network congestion and to autonomously calculate a desired SINR for the corresponding ground terminal.

16. A communication system according to claim 15 wherein the non-transitory computer readable medium is further configured to calculate a precoding matrix for a first predetermined epoch and adjusting the actual SINR according to the precoding matrix to converge the actual SINR towards a desired SINR.

17. A communication system according to claim 16 wherein the non-transitory computer readable medium is further configured to dynamically optimize a variance between the actual SINR and the desired SINR according to a Minimal-cost-Variance Control analysis.

18. A communication system according to claim 17 wherein the non-transitory computer readable medium is further configured to calculate a first Kalman gain for a the first predetermined epoch and a second Kalman gain for a later-occurring second predetermined epoch, the second Kalman gain being less than the first Kalman gain and to calculate a first power channel gain corresponding to the first Kalman gain and to calculate a second power channel gain corresponding to the second Kalman gain.

19. A communication system according to claim 18 wherein the non-transitory computer readable medium is further configured to calculate an optimal variance between the actual SINR and the desired SINR and to precode a calculated SINR adjustment to match the optimal variance.

* * * * *